United States Patent [19]
Ueda et al.

[11] Patent Number: 5,331,541
[45] Date of Patent: Jul. 19, 1994

[54] PID CONTROL UNIT

[75] Inventors: Tamio Ueda, Takatsuki; Yoshihiro Nagami, Nagaokakyo; Yumi Saito, Yawata; Zhang Zhiming, Takatsuki, all of Japan

[73] Assignee: Omron Corporation, Kyoto, Japan

[21] Appl. No.: 947,333

[22] Filed: Sep. 18, 1992

[30] Foreign Application Priority Data

Sep. 20, 1991 [JP] Japan .................... 3-241443

[51] Int. Cl.$^5$ .............................................. G05B 13/02
[52] U.S. Cl. ....................................... 364/162; 364/148
[58] Field of Search ................ 364/162, 152, 153, 148

[56] References Cited
U.S. PATENT DOCUMENTS

| | | | |
|---|---|---|---|
| 4,418,381 | 11/1983 | Molusis et al. | 364/157 |
| 4,754,391 | 6/1988 | Suzuki | 364/157 |
| 4,864,490 | 9/1989 | Nomoto et al. | 364/157 |
| 4,881,160 | 11/1989 | Sakai et al. | 364/161 |

FOREIGN PATENT DOCUMENTS

0417593A2 3/1991 European Pat. Off. .

Primary Examiner—Jerry Smith
Assistant Examiner—Paul Gordon
Attorney, Agent, or Firm—Fish & Richardson

[57] ABSTRACT

A PID control device identifies rise characteristics of a controlled system by a step response method on changing a reference, moves to PID control when idle time and slope successively obtained at the rise reach a predetermined condition, and computes PID control parameters based on the idle time and slope obtained up to that point. If the identification is fully executed, the computed PID control parameters are immediately set. If it is not fully executed, the PID control device 1 further watches the state to compare a proportional gain of the newly computed PID control parameters with the proportional gain of previously set PID control parameters, and the currently computed PID control parameters are set when the parameters are on a safe side.

4 Claims, 3 Drawing Sheets

PID CONTROL UNIT

BACKGROUND OF THE INVENTION

This invention relates to a PID control unit, and more particularly to an improved self control type PID control unit capable of automatically setting PID parameters to optimum values in accordance with a controlled system.

In a conventional PID control unit, PID control parameters are determined by an auto-tuning method employing a limit cycle in which a response wave form is oscillated by applying a predetermined manipulated variable to a controlled system and PID control parameters are set by identifying the characteristics of the controlled system in view of the response wave form. Alternatively, this is done by a step response method in which a step manipulated variable is applied to a controlled system, and PID control parameters are set by identifying the characteristics of the controlled system in view of its response wave form and thereafter a conventional closed loop control is executed. The conventional auto-tuning method, however, has the disadvantages that there are some controlled systems to which it cannot be applied or, and identification of the parameters consumes time since the response wave form is oscillated. The step response method needs an experimental operation prior to the common closed loop control to identify the characteristics of the controlled system.

SUMMARY OF THE INVENTION

It is, therefore, a primary object of this invention to provide a self control type PID control unit which does not need an oscillating response wave form nor any experimental operation for setting PID control parameters.

A self control type PID control unit according to this invention allows characteristics of a controlled system to be identified by a step response method for advancing a sequence to PID control. The PID control unit includes a step manipulated variable output means for outputting a step manipulated variable, a PID control means for generating a manipulated variable based on an error between a reference and a controlled variable obtained from the controlled system, a control mode switching means for applying the above-mentioned step manipulated variable to the controlled system to identify characteristics of the controlled system and for stopping the application of the step manipulated variable to move to PID control by the PID control means when idle time and slope successively obtained in accordance with a change of controlled variable reaches a predetermined condition, an identifying means for successively computing by a predetermined sampling period the idle time and the slope according to a change of the controlled variable by a step response of the controlled system applied by the step manipulated variable to generate an output, and a setting means for computing PID parameters based on the idle time and slope computed by the identifying means after reaching the above-mentioned condition set to the PID control means. Thus, according to this PID control unit, in order to identify characteristics of the controlled system, idle time and slope are successively computed on the basis of a response wave form produced by applying a step manipulated variable, the sequence moves to PID control when the computed idle time and slope reach a predetermined condition, and PID control parameters are computed based on the idle time and slope to be set. Thus, the conventional auto-tuning for oscillating a response wave form is not necessary and step response can be followed directly by PID control.

BRIEF DESCRIPTION OF THE DRAWINGS

A better understanding of this invention may be had from consideration of the following detailed description taken in conjunction with the accompanying drawings in which.

DESCRIPTION OF THE PREFERRED EMBODIMENT

Figure 1:
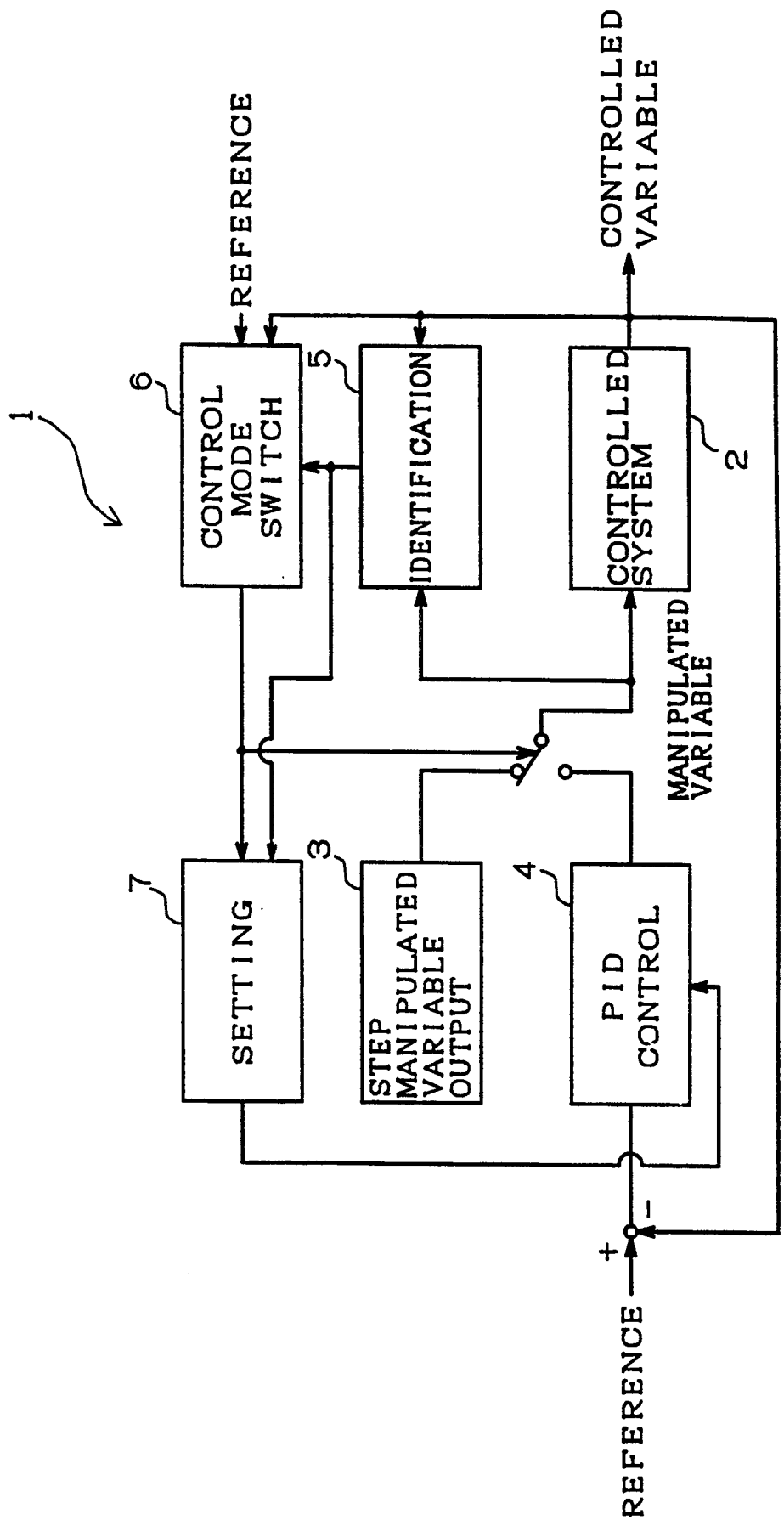
FIG. 1 is a schematic circuit block diagram of a PID control unit according to a preferred embodiment of this invention.

FIG. 1 shows a self control type PID control unit or device 1 as a preferred embodiment of this invention in which PID control parameters are automatically adjusted to optimum values in accordance with a controlled system. This control device does not need any conventional oscillation of a response wave form, nor any experimental operation apart from a conventional closed loop control. The PID control device 1 includes a step manipulated variable output unit 3 for generating a step variable having a 100% manipulated variable and a PID control unit 4 for PID control. A control mode switch 6 is also provided for selectively applying either the step manipulated variable or the PID control to a controlled system 2. The control mode switch 6 moves the control device 1 to PID control when idle time Ln and slope Rn obtained from an identification unit 6 (described below) reaches a predetermined condition necessary to identify the characteristics of the controlled system. The identification unit 5 successively computes by a predetermined sampling period the idle time Ln and the slope Rn corresponding to a change of a controlled variable of controlled system 2 to be applied to a setting unit 7 and the identification unit 5. Setting unit 7 computes PID control parameters based on the idle time Ln and the slope Rn computed by the identification unit 5 after reaching the predetermined condition and changes the PID control parameters of PID control unit 4 to the computed PID control parameters when identification is fully executed.

The control mode switch 6 switches the manipulated variable applied to the controlled system 2 to the maximum step manipulated variable from the step manipulated variable output unit 3 to move to self tuning for setting PID control parameters when the reference is changed and the current controlled variable is out of a proportional band. When the idle time Ln and the slope Rn obtained from identification unit 5 reach a predetermined condition, the application of the step manipulated variable ceases and the PID control by PID control unit 4 is initiated. In one embodiment, this predetermined condition is reached when the following relation (1) is no longer satisfied:

$$\text{current controlled variable } (y) + \text{slope } (Rn') = \text{idle time } (Ln') < \text{reference} \quad (1)$$

where "Rn'" represents the maximum slope computed until then and "Ln'" represents idle time corresponding to the slope Rn'. Accordingly, in this embodiment, the application of step manipulated variable continues until the relation is not satisfied, and the operation then moves to PID control.

Figure 2:
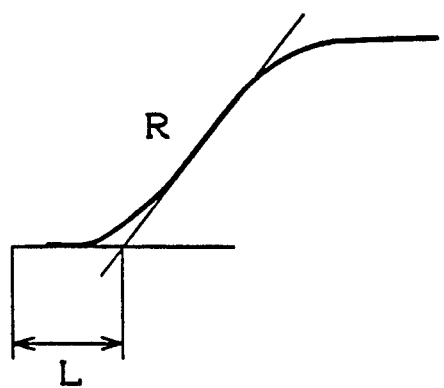
FIGS. 2(A) and 2(B) show wave forms to explain computation of slope Rn and idle time Ln of the PID control unit.
Figure 2:
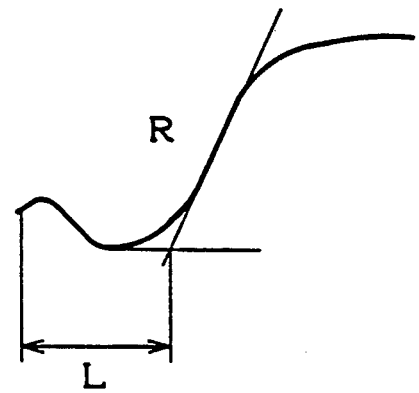

The identification unit 5 successively computes idle time Ln and slope Rn according to change of a controlled variable by step response of the controlled system regarding the step manipulated variable as illustrated in FIGS. 2(A) and 2(B) for application to control mode switching unit 6 and setting unit 7. FIG. 2(A) shows the maximum slope R and idle time L when an initial state is a balanced condition, and FIG. 2(B) shows the maximum slope R and idle time Ln when an initial state is an unbalanced condition. The slope Rn of this embodiment is computed as an average value of eight samplings with a 0.5 second sampling period. The detection point of slope Rn is the center of the eight samplings, and idle time Ln is produced by computing time from a point when the step manipulated variable is applied to a time when the slope Rn crosses the abscissa shown in FIGS. 2(A) and 2(B). The maximum slope R is obtained when a larger slope Rn is not obtained even if the application of step manipulated variable continues. Accordingly, if identification is fully executed, the maximum slope R is provided. Thus, the identification unit 5 successfully computes slope Rn and idle time Ln for every 0.5 seconds.

The setting unit 7 of this embodiment judges whether or not the maximum slope R has been precisely obtained from identification unit 5 prior to a time when the above-mentioned predetermined condition is reached and the application of step manipulated variable is finished. Then the maximum slope R has been obtained, identification is regarded as sufficient and PID control parameters are computed based on the maximum slope and corresponding idle time L to be set to the PID control unit 4 for executing PID control by the set PID control parameters.

If the maximum slope R has not been obtained from identification unit 5 prior to the finish of the application of step manipulated variable after reaching the predetermined condition, the identification is regarded to be insufficient. Accordingly, as described in more detail below, the identification unit 5 continues to compute slope Rn and idle time Ln watching controlled variable during the period of idle time Ln to compute PID control parameters based on the maximum slope Rn and idle time Ln made until then. If its proportional gain Kp is smaller than the proportional gain of PID control parameters previously set by PID control unit 4, i.e., in a safety side, the PID control parameters of control unit 4 are replaced by the computed PID control parameters. Thereafter, the computation of slope Rn and idle time Ln continues during the idle time Ln to compute PID control parameters in a same manner. If the proportional gain Kp of the computed parameters is smaller or in a safety side, the PID control parameters of unit 4 are replaced by the computed PID control parameters.

Preferably, step manipulated variable output unit 3, PID control unit 4, control mode switch 6, identification unit 5 and setting unit 7 are constituted with a micro-computer.

Thus, the PID control device 1 identifies characteristics of a rise of controlled system 2 by a step response method on changing the reference, moves to a PID control when idle time and slope successively obtained at the rise reach a predetermined condition, and computes PID control parameters based on the idle time and slope obtained so far. If the identification is fully executed, the computed PID control parameters are immediately set. If it is not fully executed, the PID control device 1 further watches the state to compare a proportional gain of the newly computed PID control parameters with the proportional gain of previously set PID control parameters, and the currently computed PID control parameters are set when the parameters are on a safe (stable) side.

Figure 3:
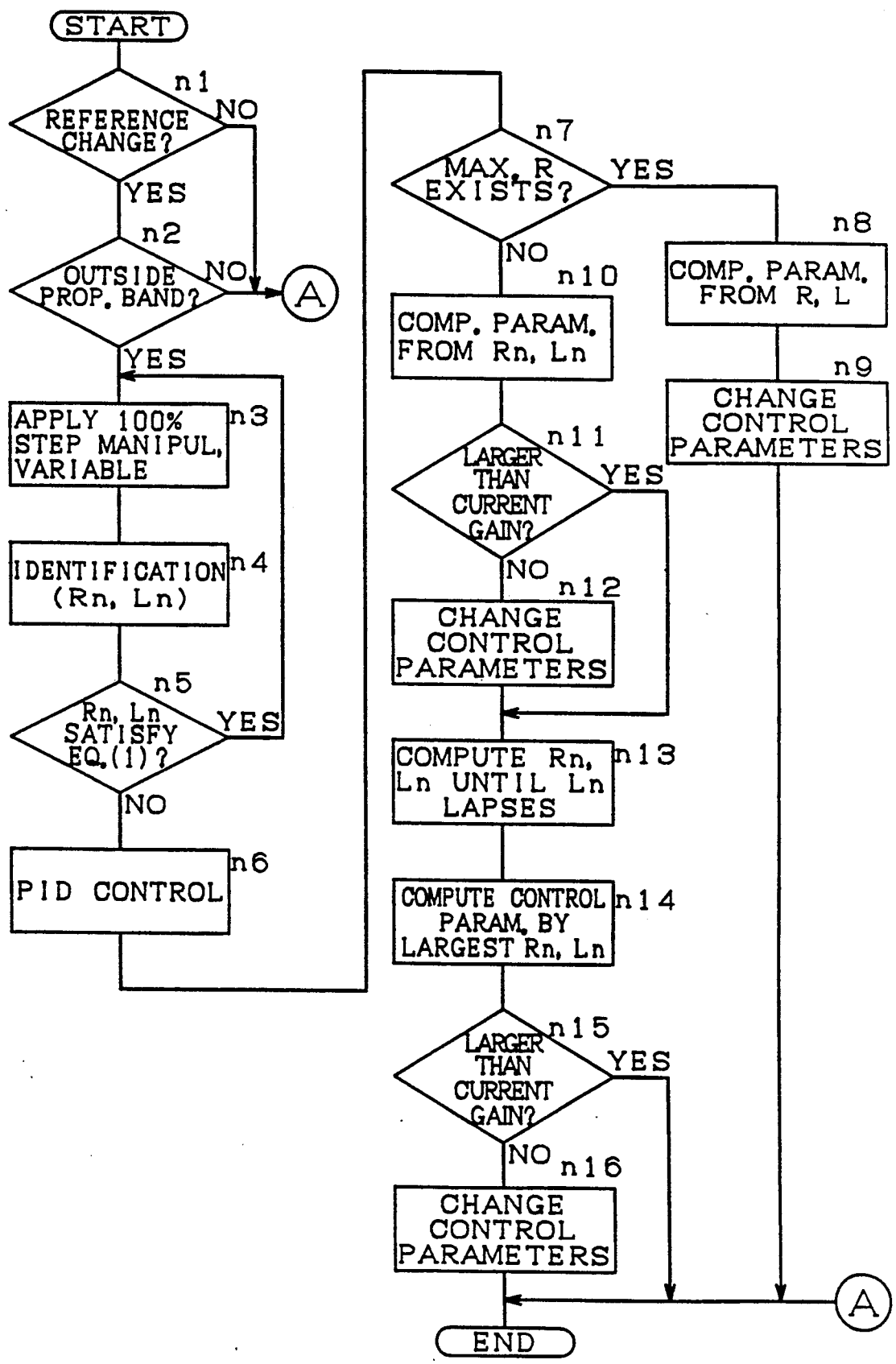
FIG. 3 is a flow chart according to the preferred embodiment.

FIG. 3 shows a flow chart of the PID control device. In an initial step N1, it is inquired if a reference is changed. If the reference is changed, the sequence moves to a step n2 where the current controlled variable is inquired to be outside a proportional band. If it is outside, the sequence moves to self tuning to apply 100% step manipulated variable (step n3). In step n4, idle time Ln and slope Rn is computed for identification based on change of the controlled variable by a step response applied to the controlled system. In step n5, it is inquired whether the idle time Ln and slope Rn produced by the identification satisfies the above-mentioned relation (1). If the relation is satisfied, the sequence from step n3 to step n5 is repeated until a No response is produced in step n5. If the relation (1) is not satisfied, application of the step manipulated variable ceases and the sequence moves to PID control in step n6. In step n7, it is inquired whether the maximum slope R has been obtained by the identification until the moment.

If the maximum slope R is obtained, the identification is judged to be sufficient, PID control parameters are computed based on the maximum slope and its corresponding idle time L in a step nS, and the PID control parameters of PID control unit 4 are changed by the computed PID control parameters in a step n9 for completion.

If the maximum slope R is not obtained in step n7, the identification is judged to be insufficient and PID control parameters are computed based on the largest slope Rn and idle time Ln among slopes obtained up to that point in step n10. In step n11, it is inquired whether the proportional gain Kp is larger than the proportional gain previously set in PID control unit 4 or is on a danger side. If the gain Kp is not larger or it is on a safe side, the PID control parameters of PID control unit 4 are changed to the computed PID control parameters in step n12. If the gain Kp is larger in step rill, the sequence moves to step n13 without changing PID control parameters.

In step n13, the slope Rn and idle time Ln are computed until further idle time Ln elapses after finish of application of the step manipulated variable, and in step n14 PID control parameters are computed based on the largest slope and idle time among slopes obtained up to that point. In step n15, it is inquired whether the proportional gain Kp is larger than the proportional gain of the PID control parameters set in the PID control unit. If the proportional gain Kp is not larger in step n15, the current computed PID control parameters are set to PID control unit 4 to be finished in step n16. If the gain Kp is larger, the sequence is finished without changing PID control parameters because the set PID control parameters are proper.

Thus, PID control is executed after identification of rise characteristics, so that conventional oscillation of response wave form is not necessary and any experimental operation apart from a general closed loop control also is unnecessary. Moreover, when the maximum slope R has not been obtained or identification is insufficient, the sequence moves to PID control, it is determined by comparing proportional gains whether PID control parameters are changed, whereby PID control parameters are prevented from being changed to the danger side and the control system is stabled. The identification is executed from the characteristic of rise in this embodiment, but, if desired, it may be executed from the fall characteristic. Though in this embodiment it is determined by comparing proportional gains whether PID control parameters are changed, the PID control parameters may be immediately changed without comparing proportional gains.

While there is shown and described an embodiment of a PID control unit according to the invention, the invention is not limited thereto. Accordingly, any modification, variation or equivalent arrangement within the scope of the attached claims is within the scope of this invention.

What is claimed is:

1. A self control type PID control unit for controlling a controlled system comprising:

step manipulated variable output means for outputting a step manipulated variable, PID control means for generating a manipulated variable based on an error between a reference and a controlled variable obtained from the controlled system, control mode switching means for applying said step manipulated variable to the controlled system and for stopping the application of the step manipulated variable to move to PID control by said PID control means when idle time and slope successively obtained in accordance with a change of said controlled variable reach a predetermined condition, identification means for successively computing by a predetermined sampling period the idle time and the slope according to a change of the controlled variable by a step response of the controlled system applied by the step manipulated variable to provide an output, and setting means for computing PID control parameters based on said idle time and said slope computed by said identification means after reaching said predetermined condition to be set to said PID control means.

2. A PID control unit according to claim 1 in which said step manipulated variable output means generates a maximum step manipulated variable.

3. A PID control unit according to claim 2 in which said setting means sets said computed PID control parameters only when a proportional gain of said computed PID control parameters is smaller than a proportional gain of PID control parameters previously set in said PID control means.

4. A PID control unit according to claim 1 in which said setting means sets said computed PID control parameters only when a proportional gain of said computed PID control parameters is smaller than a proportional gain of PID control parameters previously set in said PID control means.

* * * * *